(12) United States Patent
Stips et al.

(10) Patent No.: US 10,889,069 B2
(45) Date of Patent: Jan. 12, 2021

(54) FIBRE-REINFORCED PLASTIC MATERIAL

(71) Applicants: Michael Stips, Greafelfing (DE); Ferdinand Rothkopf, Neumarkt-Sankt Veit (DE)

(72) Inventors: Michael Stips, Greafelfing (DE); Ferdinand Rothkopf, Neumarkt-Sankt Veit (DE)

(73) Assignees: Michael Stips; Ferdinand Rothkopf

( * ) Notice: Subject to any disclaimer, the term of this patent is extended or adjusted under 35 U.S.C. 154(b) by 175 days.

(21) Appl. No.: 16/121,181

(22) Filed: Sep. 4, 2018

(65) Prior Publication Data

US 2020/0070433 A1    Mar. 5, 2020

Related U.S. Application Data

(62) Division of application No. 14/417,238, filed as application No. PCT/DE2013/100277 on Jul. 26, 2013, now abandoned.

(51) Int. Cl.
*B29C 70/02* (2006.01)
*B29C 70/68* (2006.01)
*B29C 70/70* (2006.01)

(52) U.S. Cl.
CPC .......... *B29C 70/023* (2013.01); *B29C 70/681* (2013.01); *B29C 70/70* (2013.01)

(58) Field of Classification Search
CPC ... B29C 70/023; B29C 70/681; B29C 70/683; B29C 70/682; B29C 70/70
See application file for complete search history.

(56) References Cited

U.S. PATENT DOCUMENTS

| 6,090,322 A | * | 7/2000 | Tsurutani | B29C 33/16 264/135 |
| 2008/0028574 A1 | | 2/2008 | Mack et al. | |
| 2015/0273774 A1 | * | 10/2015 | Stips | B29C 45/14786 428/99 |

FOREIGN PATENT DOCUMENTS

| DE | 19834772 | 2/2000 |
| DE | 1020004062895 | 6/2006 |
| FR | 2664529 | 1/1992 |
| GB | 794166 | 4/1958 |
| JP | 2011143609 A | * 7/2011 |

OTHER PUBLICATIONS

Partial machine translation of JP 2011-143609 A dated Jul. 2011 obtained from the espace website. (Year: 2011).*
International Search Report dated Dec. 3, 2013.

* cited by examiner

*Primary Examiner* — Robert B Davis
(74) *Attorney, Agent, or Firm* — Gerald E. Hespos; Michael J. Porco; Matthew T. Hespos

(57) ABSTRACT

A method for producing a component made of fiber-reinforced plastic includes comprises the steps of providing at least one insert part, placing the insert part in a mold and embedding the insert part using a matrix material and at least one fiber mat in the mold. The insert part is provided as a closed capsule.

6 Claims, 6 Drawing Sheets

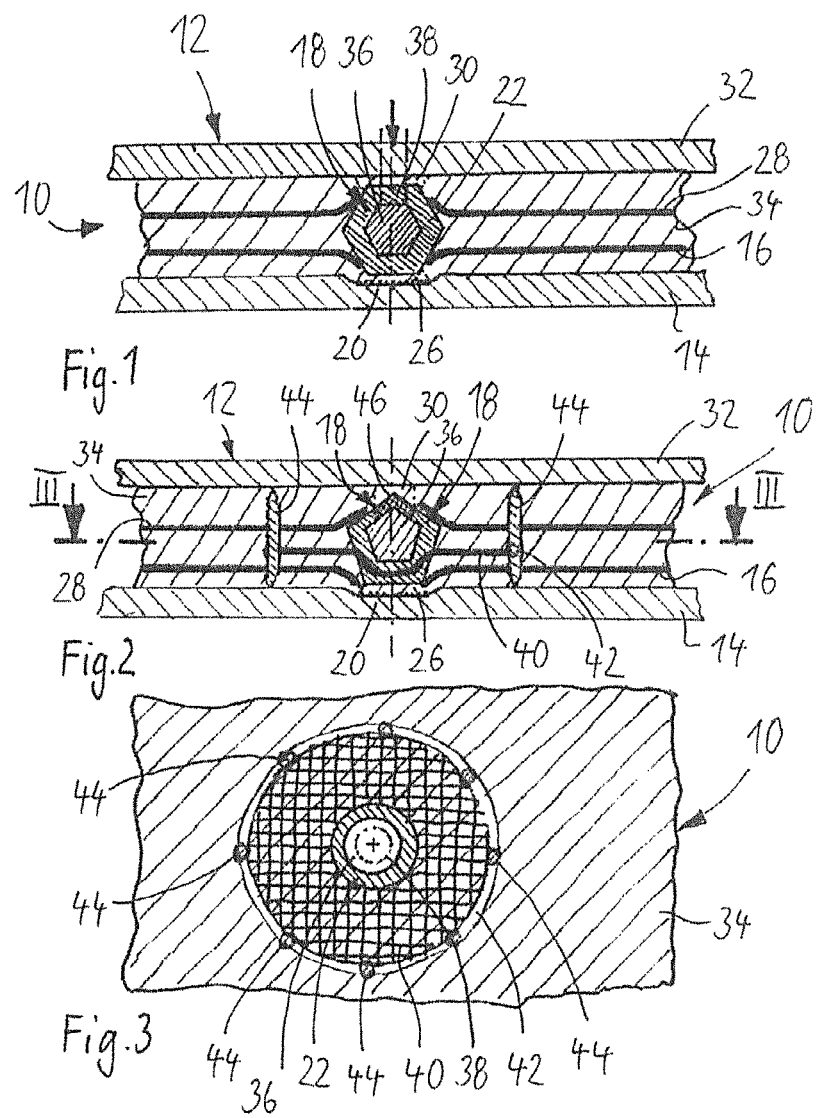

FIBRE-REINFORCED PLASTIC MATERIAL

The present application is a divisional application of U.S. patent application Ser. No. 14/417,238, filed Mar. 27, 2015, the contents of which are hereby incorporated by reference in their entirety.

BACKGROUND

1. Field of the Invention

The invention relates to a method for producing a component made of fiber-reinforced plastic or a composite. Further, the invention relates to a component or composite that has been produced according to such a method.

2. Description of the Related Art

Components made of fiber-reinforced plastic are also called composite components. They are made of glass, carbon, or other reinforcing fibers, which are surrounded by a matrix material. The fibers are arranged in the component usually in the form of a woven fabric, scrim, a knitted fabric, and/or a braid, optionally also in the form of a nonwoven and fixedly embedded with the matrix material. To produce components of this type, the scrim is first placed in a component mold that is open on one side or completely closable. The matrix material in the liquid phase is then introduced into this mold, in closed molding tools preferably under high pressure. The matrix material is usually a polymer or a plastic, particularly an epoxy resin, polyester, or polyurethane. The components therefore consist of reinforcing fibers and a plastic matrix and are accordingly also called a fiber-plastic composite (FPC), fiber-reinforced plastic, or fiber composite plastic (FCP).

The matrix material surrounds the fibers, which are bound to the matrix material by adhesive or cohesive forces. Advantageous structural materials, which have a high specific strength and stiffness, form by a suitable combination of fiber and matrix material. If desired, the elasticity behavior can be made directionally dependent by the arrangement of the fibers.

In regard to their own weight, such components have outstanding mechanical properties, so that they can be used ideally for lightweight construction applications in boat building, in aircraft construction, but also in tank construction and vehicles.

In order to stiffen such components further, it is known to employ insert parts into the composite component. For this purpose, insert parts are placed in the appropriate mold and then the matrix material is poured around them.

It is disadvantageous thus far in insert parts of this type that with cooling and during use of the components stresses and incoherencies arise between the insert part and the associated rest of the component, therefore at the interfaces between the component and insert part; these have a great negative effect on the strength of the insert part in the component over the lifetime thereof. Such stresses can be absorbed only to a limited extent in known components. Undesirable breaks between the insert part and the rest of the component often occur.

SUMMARY OF THE INVENTION

The invention relates to a method for producing a component made of fiber-reinforced plastic comprising the following steps: providing at least one insert part, placing the insert part in a mold, embedding the insert part using a matrix material and at least one fiber mat or scrim in the mold, whereby the insert part is provided as a closed capsule.

According to the invention, the insert part to be inserted into a composite material is formed as a capsule. Such a capsule has a structure completely closed on the outside, in which a capsule interior can be located for the attachment and fastening of a fastening element. The capsule is closed in such a way thereby and is stable such that during the process of inserting matrix material into the respective component mold, no or only a predefined amount of matrix material can enter the capsule interior or the inside of the capsule. It is assured thereby according to the invention that the component mold can be filled with matrix material without notable additional effort, substantially in the customary manner and in conformity with a similar quality. This is the case even when the matrix material is introduced at high pressure into the appropriate mold. At the same time, in the case of such an introduction of the matrix material into the mold, the insert part of the invention is completely enclosed by the matrix material.

The outer shell of the capsule of the invention can be adapted selectively to the incorporation situation in the component. The pairing of surfaces, advantageously adapted in such a way, between the insert part and the rest of the component extends over the entire outer surface of the insert part, so that local stress peaks cannot occur.

At the same time, according to the invention the capsule can contain advantageously in particular a fastening element or even function as a fastening element itself. The fastening element in this case can be formed in the shape of a form-fitting part, particularly as a threaded sleeve, as a hollow space with a cord located therein, or as a hollow space with an undercut. Further, the fastening element can be formed advantageously as a force-closure part, particularly as a clamping sleeve or as a mass or receiving element for a self-tapping screw.

Certain metal alloys should not come into contact with fiber materials for electrochemical reasons. Therefore, extremely expensive metal alloys must be used in known fastening elements, such as rivets in the matrix material. This is not necessary, in contrast, in the fastening elements integrated encapsulated according to the invention.

In addition, a stiffening element in particular can be taken up in the capsule of the invention and/or the capsule can be designed elongated in a fin form or bar form, in order to exert a ribbing-like effect on the planar composite parts.

In an advantageous refinement of the invention, the capsule is formed with a predetermined opening or predetermined breaking point for the attachment of a fastening means after the curing of the composite part.

The predetermined opening is to be understood as a capsule section that can be opened relatively easily and optionally with a simple tool. Thus, the predetermined opening of the invention is preferably closed by means of a removable cover. Alternatively, the predetermined opening is to be broken or cut open. The predetermined opening thereby provides access to a hollow space in which there is in particular a fastening element, e.g., in the form of a screw sleeve. The hollow space further preferably has an undercut, behind which, e.g., a blind rivet can be inserted. Especially preferably, the edge of the undercut is formed reinforced, for instance, by means of a thickening or an inserted disk.

Further, according to the invention a method, particularly of the aforementioned type, is provided for producing a composite part or component made of a fiber-reinforced plastic, comprising the following steps: providing at least one insert part, placing the insert part in a mold, embedding the insert part with a matrix material and at least one fiber mat in the mold, whereby the insert part is formed with outwardly protruding fiber strands and a central element connecting the fiber strands. The fiber strands can have very different forms and also be intertwined or interwoven with one another. Furthermore, they can have thickenings, in order to be retained better in the matrix material.

The fiber strands provided thereby are advantageously formed in the shape of individual strands or even as a woven fabric, scrim, a knitted fabric, and/or a braid or a nonwoven. The central element connects fiber strands of this type and holds them in position, so that they can be positioned and held in the mold in an especially simple manner.

The central element can be formed especially advantageously as a capsule, as described heretofore. Alternatively, it can be formed as a cup or tube. In this case, there is in the cup or tube a hollow space, which can be closed after insertion in a mold by pressing against at least one mold wall. It can be assured in this way that during the introduction of the matrix material into the mold, no matrix material can collect in the interior of the central element. Thus, the interior space remains free for the later introduction of a stiffening or fastening means.

Preferably, further a plurality of central elements are connected to one another by means of the fiber strands. A network of insert parts or a net-like insert part results, which provides a plurality of attachment points with its central elements. The network can be positioned, particularly laid out, in a simple way in the mold, and the fiber strands thereby keep the individual central elements apart. Further, the network can be used as an additional stiffening instrument and stiffeners can be provided selectively between individual central elements or be inserted later. A stiffening structure, protruding or projecting from the surface of the component, can be coupled in addition in this way to a planar component. Accordingly, preferably a plurality of central elements as well are connected to one another by suitable means.

The individual insert part is thereby preferably anchored wedged in the matrix material, particularly behind the fiber mat, from the perspective of the fastening site. To this end, the insert part is arranged in the manner of a button in a buttonhole in the fiber mat. In this regard, the insert part can be passed through an opening in the fiber mat through said mat or the insert part is placed in the mold first and then the fiber mat is placed over it.

The capsule or the central element used thereby is formed particularly on its outer side with the matrix material or a material similar thereto.

With this type of exterior design of the central component of the insert part of the invention, a material connection with the material of the matrix, therefore the matrix material, can be produced. Because of the different expansion behavior, thermal stresses in particular can thus be largely avoided.

The central element is preferably formed with a mandrel for sliding over at least one fiber mat in the mold.

In this type of design, at least one insert part is placed in the mold. Then, a fiber mat is inserted and accordingly pushed over the mandrel. The mandrel upon insertion of the fiber mat opens the fiber fabric and pushes apart the fibers thereof. In this case, preferably the fiber fabric is not destroyed. The mandrel accordingly is advantageously designed with a blunt rounded tip and has no sharp sections. The mandrel, then penetrating through the fiber mat, can be removed later to provide space for a fastening means, or to serve as a fastening means itself.

Further, according to the invention a method is provided for producing a component made of fiber-reinforced plastic or a composite part, particularly according to the aforementioned type, comprising the following steps: providing at least one insert part, placing the insert part in a component mold, embedding the insert part with a matrix material and at least one fiber mat in the component mold, whereby the component mold is provided with a means for the positionally correct arrangement of the insert part in the component mold.

The means of this type is used for placing and fixing the insert part in the component mold. It is assured by the means that the insert part does not change its position in the mold, even if the matrix material is injected at high pressure into the component mold.

In the case of a one-piece component mold, the insert part can be fixed in its position by placing on or inserting in a formation or depression on the mold. In the case of a two-part or multi-part mold, the insert part can be clamped in addition between parts of the mold or halves of the mold.

Especially preferably, the means is formed with a depression for placing the capsule or the central element in the mold.

In this regard, the capsule or central element of the insert part preferably has at least one spacer, particularly in the form of a fin, bar, stud, or spike, so that it can be spaced apart from the mold. Matrix material can then subsequently flow into the free space created thereby between the mold surface and the capsule or the central element, in order to surround the insert part advantageously over large areas, completely, and sealingly with the matrix material.

Providing a rod for placing the insert part thereon in the mold is an especially simple means for fastening an insert part in a mold. Said rod can attached fixedly in the mold. It can be removed from the mold, e.g., can be inserted or screwed in at the mold surface.

The insert part with an appropriate opening then only needs to be placed on the rod. Further, the insert part can be screwed onto such a rod, if the latter is formed as a threaded rod or threaded sleeve and can be removed from the mold. The threaded section on the insert part can later be used like a fastening means for the composite component.

Advantageously, further the means for fastening the insert part in the mold is formed with suction for at least one part of the insert part.

The insert part can be kept on the mold by means of low pressure with the suction. To this end, in particular the aforementioned mandrel can be made hollow. A hollow mandrel can be used further to draw in a part of the insert part, particularly a fibrous section or a fiber strand or the like, and in this manner makes sure that it later protrudes from the finished component and the matrix material thereof. The protruding section can be used to fasten thereto a fastening means or a further component. A suction arrangement can also be used to pull or pass a part of the insert part through the fiber fabric of the component itself. The aforementioned arrangement as a type of "button in a buttonhole" can also be produced thereby.

Finally, the invention provides further a component made of fiber-reinforced plastic, which has been produced according to the aforementioned method. Moreover, the invention is directed to an insert part employed for this purpose, as is explained here.

In this regard, it is provided according to the invention to provide an insert part, which is shaped like a closed capsule. The capsule preferably has a predetermined opening for attaching a fastening means.

According to the invention, further an insert part is formed with outwardly protruding, particularly planar fiber strands or strands protruding in a plane and a central element connecting the fiber strands. Further, the fiber strands are supported in addition advantageously at their end region facing away from the central element. It is assured in this way that they remain in position in the mold when the matrix material flows in. The support is advantageously formed by a ring surrounding the central element. The ring is advantageously connected additionally by means of spokes to the central element and thereby supported by the central element. Especially preferably pins, which are formed particularly integrally with the ring and protrude from the ring in the direction of the associated mold, are arranged on the ring. The pins secure a positioning of the ring within the mold, so that particularly when the matrix material flows into the component mold, the fiber strands are not shifted in an undesirable manner. At the same time, the ring leaves sufficient space within the mold, so that the matrix material can flow and surround the fiber strands themselves. As a result, a close connection between the composite part and the fiber strands, and thereby the insert part itself, can be created.

The capsule or the central element is formed particularly on its outer side with the matrix material or a material similar thereto. Further, preferably the central element is formed with a mandrel for sliding over at least one fiber mat.

The invention also relates to a component mold, whereby a means for the positionally correct arrangement of the insert part in the mold is provided. The means is preferably formed with a depression for the insertion of the described capsule or of the central element in the mold. Alternatively or in addition, the means is formed with a rod for the placement of the insert part thereon. Moreover, the means can be formed advantageously with suction for at least one part of the insert part.

BRIEF DESCRIPTION OF THE DRAWINGS

FIG. 1 shows a longitudinal section of a first exemplary embodiment of a component made of fiber-reinforced plastic with an insert part of the invention;

FIG. 2 shows a longitudinal section of a second exemplary embodiment of a component made of fiber-reinforced plastic with an insert part of the invention;

FIG. 3 shows the cut III-III in FIG. 2;

DETAILED DESCRIPTION OF THE EXEMPLARY EMBODIMENTS

Figure 4:
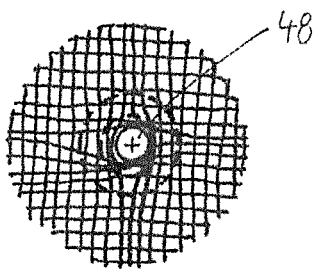
FIG. 4 shows a top plan view of a fiber disk of an insert part according to FIG. 3.

In FIG. 1 a composite part or component 10 made of fiber-reinforced plastic is shown in a component mold or mold 12. Mold 12 is formed with a bottom mold half 14, in which a first fiber mat 16 made of glass fiber has been placed. An insert part 18 has been placed on fiber mat 16. Insert part 18 is located in the area of a depression 20, which has been incorporated as a means for fastening insert part 18 in mold 12 in the bottom mold half 14 thereof.

In this case, insert part 18 is formed as a capsule and has a capsule housing 22, on whose bottom side a downward protruding spacer 26 is located in the form of fins, bars, studs, or spikes. Spacer 26 projects through first fiber mat 16, whereby to this end one or more cutouts can be provided in it. Preferably, fiber mat 16 is undamaged in this case, however, and its fibers are largely not broken.

A second fiber mat 28 is placed on the thus placed and encapsulated insert part 18. In this regard, insert part 18 on its upwardly directed top side as well has a top spacer 30, with which in correspondence to the bottom spacer it is supported against a second, top mold half 32. Insert part 18 is thus held centrally in mold 12 with spacers 26 and 30 and can be completely surrounded by matrix material 34. Spacers 26 and/or 30 are thereby designed preferably elastic in shape, so that in a closing movement of the two mold halves 14 and 32 they can lie against mold 12 and thereby can also draw back somewhat. As a result, subsequent pushing or pressing of the two mold halves 14 and 32 onto matrix material 34 with a simultaneous, positionally correct arrangement of insert part 18 can be realized. In the interior of capsule housing 22, a capsule interior space 36 is hermetically sealed off from matrix material 34.

On the top side (in relation to the figure) of capsule housing 22 there is a predetermined opening 38, through which one can enter capsule interior space 36 from the outside, in order to fix particularly a fastening element therein. In this way, component 10 can be advantageously fastened or itself serve as a fastening for other components.

FIGS. 2 and 3 show an insert part 18, in which capsule housing 22 is produced by injection molding of a plastic and thereby a plurality of fiber strands 40 are co-injected in capsule housing 22 in the form of a radially outwardly protruding fiber disk. Such fiber strands 40 are located between the two fiber mats 16 and 28 and with them via matrix material 34 form a close and simultaneously high-strength connection. So that fiber strands 40 are not shifted during the injection of matrix material 34 into mold 12, preferably the fiber disk is held on its outer perimeter with a likewise injection-molded ring 42. Ring 42 has a total of eight pins 44, which are arranged distributed uniformly on its perimeter and protrude upward and downward, and with which the ring is held at predefined distances to the bottom mold half 16 and the top mold half 32. Capsule housing 22 further has on its top side in the middle a mandrel 46, which facilities the sliding of second fiber mat 32 over capsule housing 22.

Figure 5:
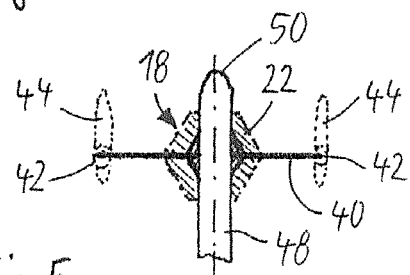
FIG. 5 shows a longitudinal section of the production of the insert part according to FIG. 3.
Figure 6:
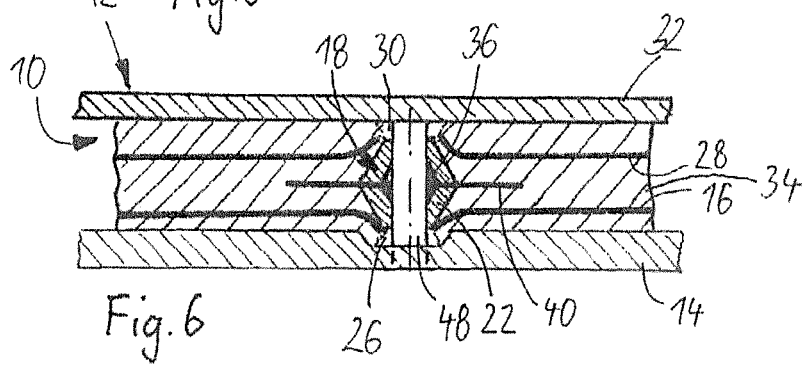
FIG. 6 shows a longitudinal section of a third exemplary embodiment of a component made of fiber-reinforced plastic with an insert part of the invention.
Figure 7:
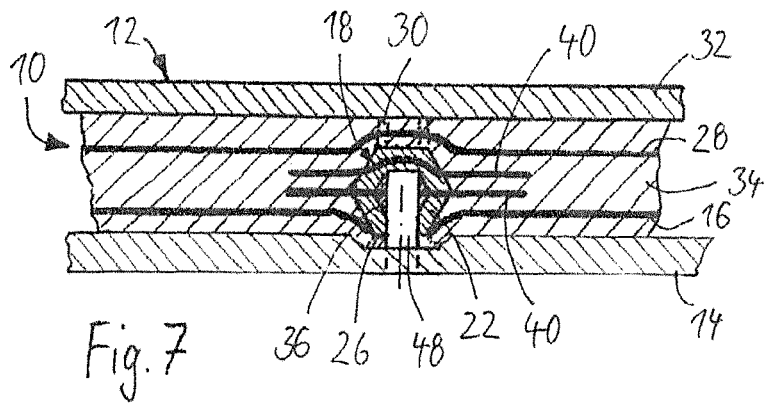
FIG. 7 shows a longitudinal section of a fourth exemplary embodiment of a component made of fiber-reinforced plastic with an insert part of the invention.

It is illustrated in FIGS. 4 and 5 how a structurally similar insert part 18 is to be produced. For this purpose, first fiber strands 40 forming a fiber disk are pushed centrally over a rod 48, without substantially damaging thereby the fibers of the fiber disk itself. To this end, rod 48 has a round tip 50 at one end. Next, capsule housing 22 and advantageously ring 42 and pins 44 are molded around rod 48 by injection molding to the fiber mat (FIG. 5). Insert part 18 then has in its center an opening, particularly a through-hole (FIG. 6) or a blind hole (FIG. 7), by means of which it is fixedly positioned in the appropriate mold 12 on a structurally similar rod 48, arranged there, and can be kept at high pressure during the pouring in of matrix material 34.

Figure 8:
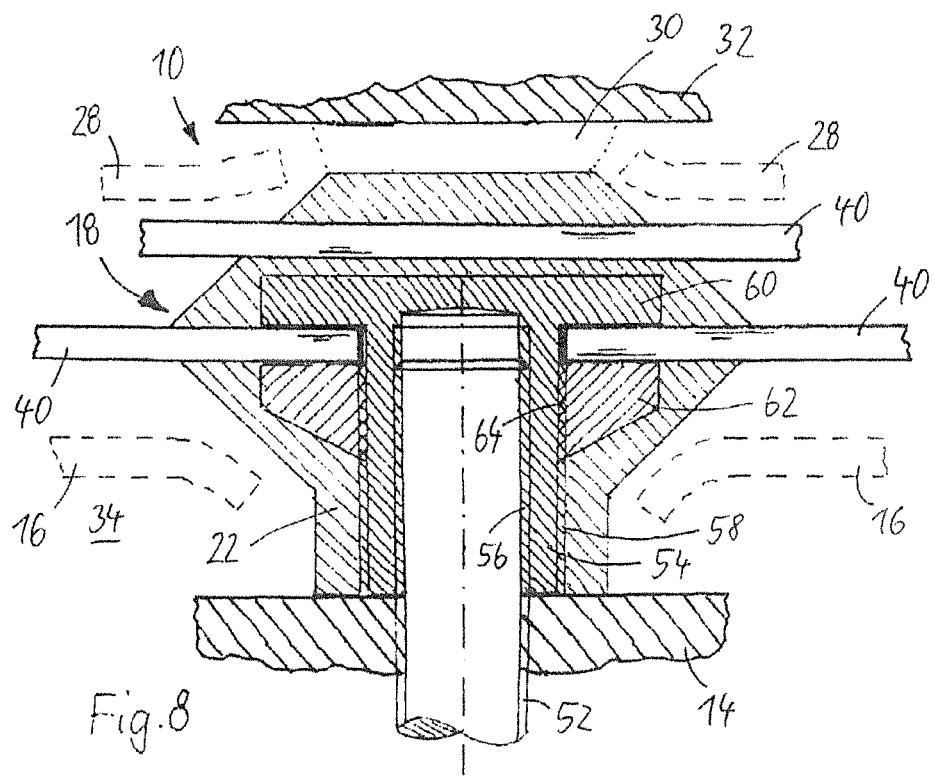
FIG. 8 shows a longitudinal section of a fifth exemplary embodiment of a component made of fiber-reinforced plastic with an insert part of the invention.

To hold such an insert part 18 on a rod 48 in a mold 12, according to FIG. 8 rod 48 is advantageously provided with an outer thread 52, onto which a screw sleeve 54, having an inner thread 56 and located in the interior of capsule housing 22, is screwed. Rod 48 can thereby be screwed with its outer thread 52 into mold 12 itself. Alternatively, it can also be inserted in mold 12. Screw sleeve 54 advantageously further has an outer thread 58 and a clamping plate 60 oriented transversely thereto. A clamping nut 62 with an inner thread 64 can then be screwed onto outer thread 58. Thus, fiber strands 40 of a fiber disk can be clamped between clamping plate 60 and clamping nut 62 in order to fix fiber strands 40 directly on screw sleeve 54.

Figure 9:
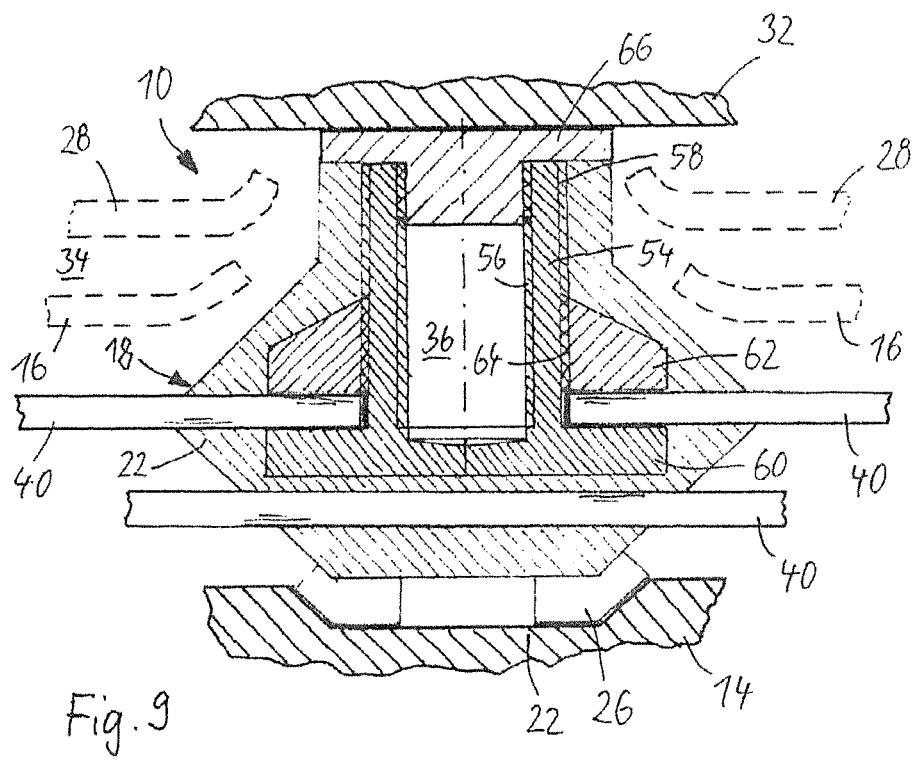
FIG. 9 shows a longitudinal section of a sixth exemplary embodiment of a component made of fiber-reinforced plastic with an insert part of the invention.

As illustrated in FIG. 9, in this alternative design, insert part 18, formed with a screw sleeve 54, is held on its bottom side in a depression 20 by means of a bottom spacer 26. On its top side, inner thread 56 of clamping sleeve 54 on the appropriate capsule housing 22 is closed with a later removable housing cover 66. Housing cover 66 serves simultaneously to support capsule housing 22 on the top mold half 32 during the supplying and curing of the matrix material.

Figure 10:
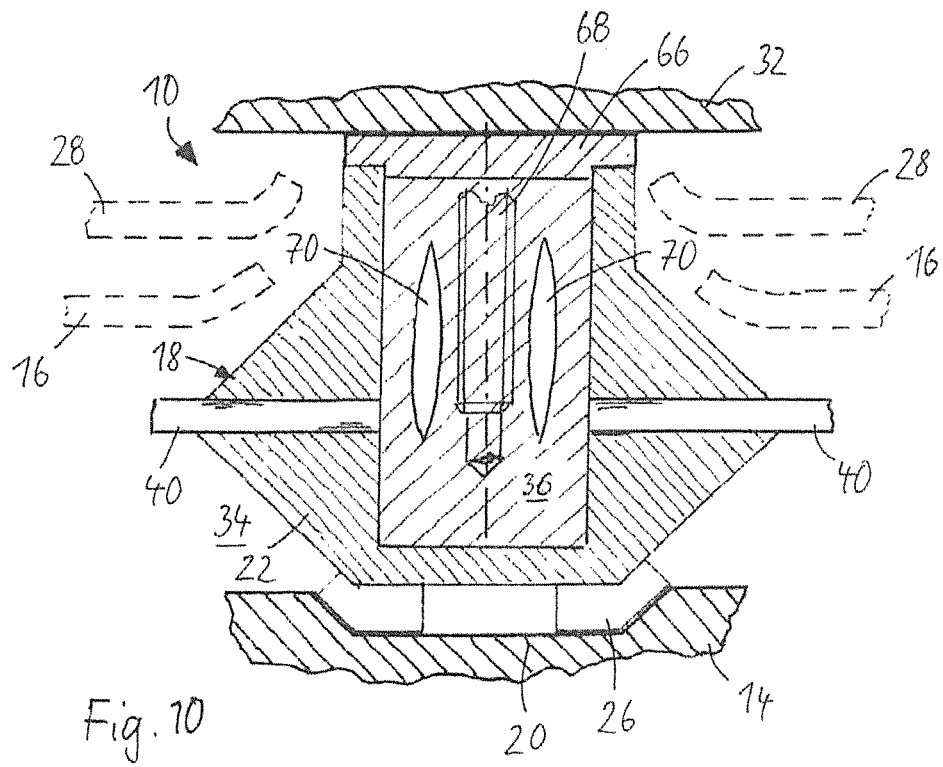
FIG. 10 shows a longitudinal section of a seventh exemplary embodiment of a component made of fiber-reinforced plastic with an insert part of the invention.

FIG. 10 shows a variant in which a housing cover 66 is also provided. In this case, capsule interior space 36 is formed filled, whereby a central predrilled hole 68 for the later screwing in of a fastening screw and optionally other free spaces for an elastic deformation of the filling material are provided in the filling material.

Figure 11:
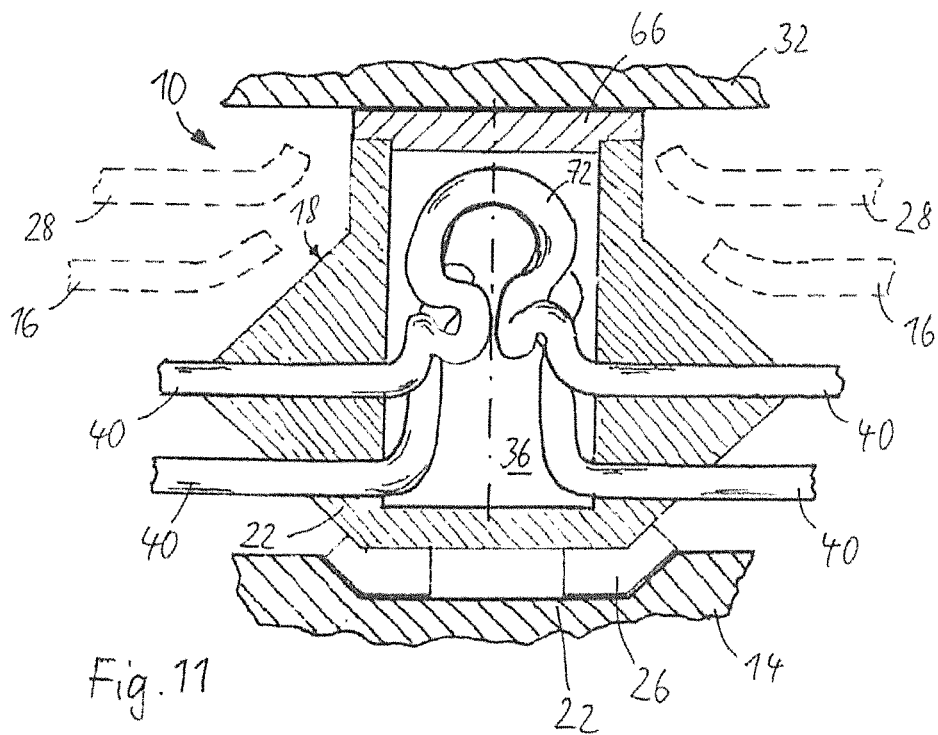
FIG. 11 shows a longitudinal section of an eighth exemplary embodiment of a component made of fiber-reinforced plastic with an insert part of the invention.
Figure 12:
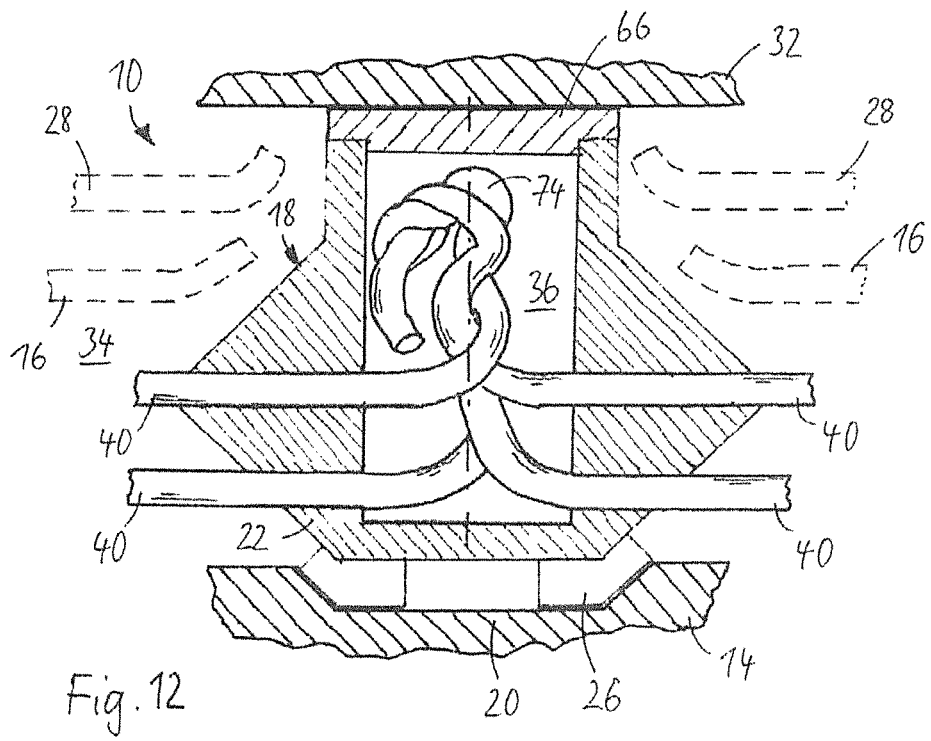
FIG. 12 shows a longitudinal section of a ninth exemplary embodiment of a component made of fiber-reinforced plastic with an insert part of the invention.
Figure 13:
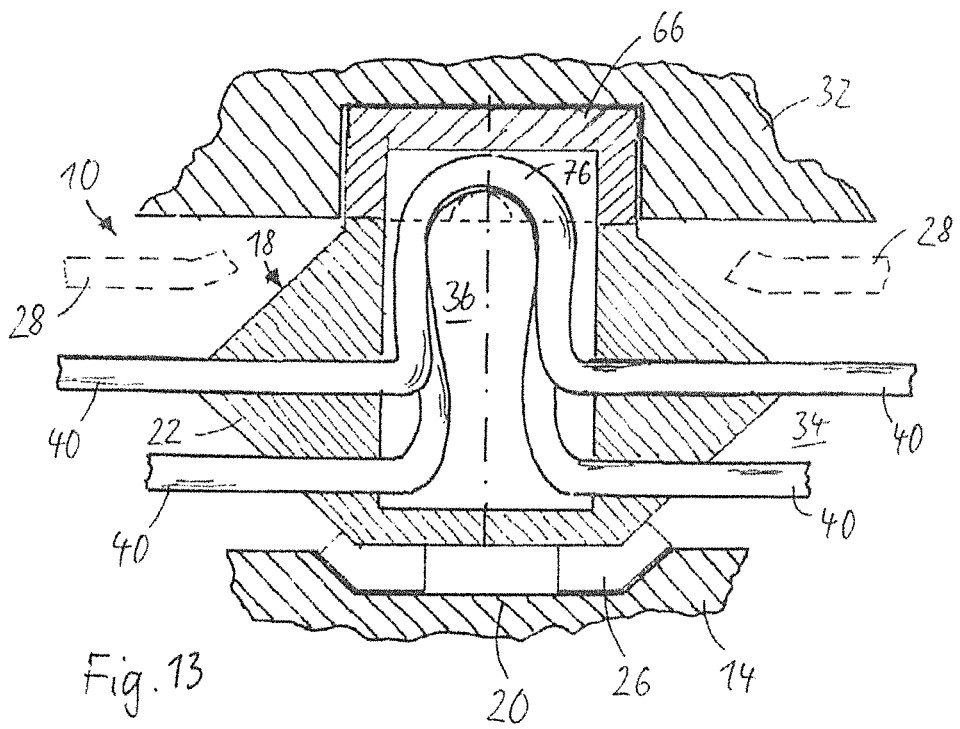
FIG. 13 shows a longitudinal section of a tenth exemplary embodiment of a component made of fiber-reinforced plastic with an insert part of the invention.

In the variant according to FIG. 11, in capsule interior space 36 a plurality of fiber loops 72 are provided, which arise particularly directly from fiber strands 40 of the fiber disk. Said fiber loops 72 can be run outward after removal of housing cover 66, in order to attach thereto a fastening element or directly an object to be fastened. According to FIG. 12, a similar variant is created, in which instead of fiber loops 72 a plurality of fiber strings 74, particularly twisted together, are provided in capsule interior space 36. On these likewise removable fiber strings 74 advantageously a thickening, particularly in the form of a knot, can be provided at the end region to facilitate the fastening. FIG. 13 shows a variant in which a fiber sling 76 is placed in capsule interior space 36 and particularly embedded in the surrounding filling material so that after removal of housing cover 66 it protrudes out of capsule housing 22.

Figure 14:
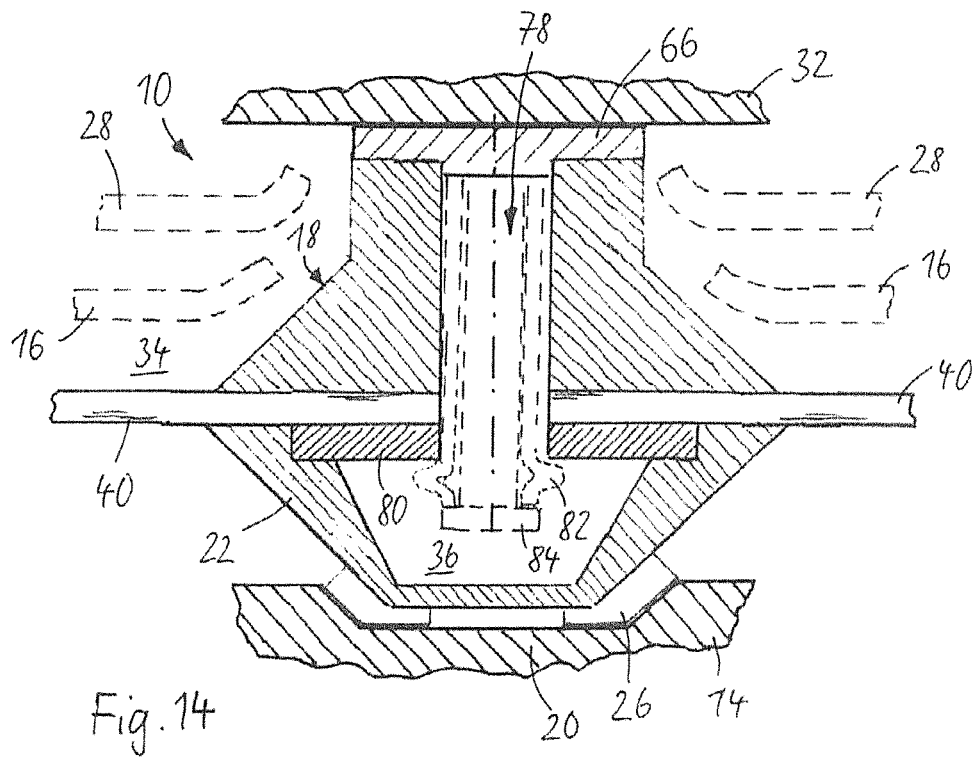
FIG. 14 shows a longitudinal section of an eleventh exemplary embodiment of a component made of fiber-reinforced plastic with an insert part of the invention.

A version is illustrated in FIG. 14 in which in capsule housing 22 at the top side a through-hole 78 is formed in capsule interior space 36. At the bottom end of through-hole 78 there is under fiber strands 40 a transversely extending disk 80, to which a blind rivet 82 can be attached by means of a riveting tool 84 through through-hole 78.

Figure 15:
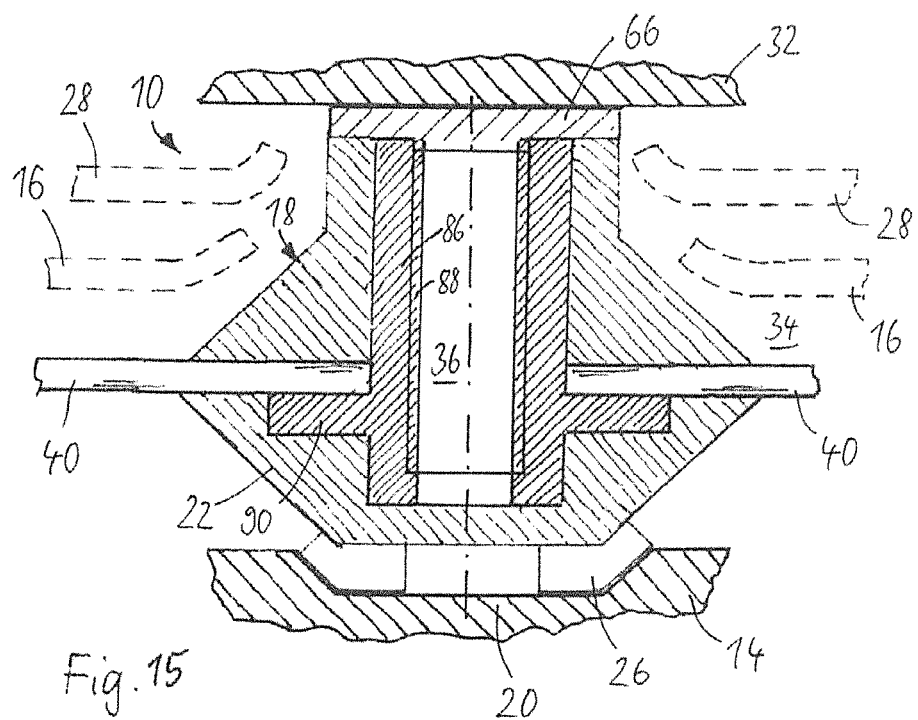
FIG. 15 shows a longitudinal section of a twelfth exemplary embodiment of a component made of fiber-reinforced plastic with an insert part of the invention.

Finally, a variant of an insert part 18 is illustrated in FIG. 15, in which in capsule housing 22 a threaded sleeve 86 with an inner thread 88 and with a disk section 90 engaging under fiber strands 40 is injected.

In conclusion, it should be noted that all features, mentioned in the application documents and particularly in the dependent claims, despite the formal reference made back to one or more specific claims, are to be granted independent protection also individually or in any combination.

LIST OF REFERENCE CHARACTERS

10 Component made of fiber-reinforced plastic
12 Mold
14 Bottom mold half
16 First fiber mat
18 Insert part, in the form of a capsule
20 Depression in the bottom mold half
22 Capsule housing, forms the central element
26 Bottom spacer
28 Second fiber mat
30 Top spacer
32 Top mold half
34 Matrix material
36 Capsule interior space
38 Predetermined opening
40 Fiber strands in the form of a fiber disk
42 Ring
44 Pin on ring
46 Mandrel on capsule housing
48 Rod
50 Rounded tip
52 Outer thread on rod
54 Screw sleeve
56 Inner thread on the screw sleeve
58 Outer thread on the screw sleeve
60 Clamping plate on the screw sleeve
62 Clamping nut
64 Inner thread on clamping nut
66 Housing cover
68 Predrilled hole
70 Free space
72 Fiber loop
74 Fiber string
76 Fiber sling
78 Through-hole
80 Disk
82 Blind rivet
84 Riveting tool
86 Threaded sleeve
88 Inner thread
90 Disk section

What is claimed is:

1. An insert part (18) for producing a component (10) made of fiber-reinforced plastic by placing at least one fiber mat (16, 28) and the insert part (18) in a mold (12) and embedding the at least one fiber mat (16, 28) and the insert part (18) with a matrix material (34), the insert part (18) being a completely closed and stable capsule (22) so that no matrix material (34) can enter an interior of the capsule (22), and the completely closed capsule (22) having an opening (38) closed by a removable cover that enters the opening of the capsule (22) embedded in the matrix material (34), and whereby the completely closed capsule (22) is provided with a fastening element integrated and encapsulated in the capsule (22) for attachment of a fastening means in the interior of the capsule (22).

2. An insert part (18) for producing a component (10) made of fiber-reinforced plastic by placing at least one fiber mat (16, 28) and the insert part (18) in a mold (12) and embedding the at least one fiber mat (16, 28) and the insert part (18) with a matrix material (34), the insert part (18) being formed with a central element (22) and outwardly projecting fiber strands (40), and the central element (22) connecting the fiber strands (40) and holding the fiber strands in position as one piece, so that the central element (22) and the fiber strands (40) can be placed in the mold (12) for embedding the at least one fiber mat (16, 28) and the insert part (18) with the central element (22) and the fiber strands (40) with the matrix material (34).

3. The insert part (18) of claim 2, wherein the central element (22) is formed on its outer side with the matrix material (34).

4. The insert part (18) of claim 3, wherein the fiber strands (40) are supported further by a support their end region facing away from the central element (22).

5. The insert part (18) of claim 4, wherein the support is formed by a ring (42) surrounding the central element (22).

6. The insert part (18) of claim 3, wherein the central element (22) is formed with a mandrel (46) for sliding over at least one fiber mat (28) in the mold (12).

* * * * *